(12) United States Patent
Huang et al.

(10) Patent No.: US 7,845,194 B2
(45) Date of Patent: Dec. 7, 2010

(54) METHOD OF SPLICING OPTICAL FIBERS WITH ARC IMAGINING AND RECENTERING

(75) Inventors: Wei-Ping Huang, Spånga (SE); Tomas Adebäck, Järfälla (SE); David Wallin, Järfälla (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 2029 days.

(21) Appl. No.: 10/275,687

(22) PCT Filed: May 9, 2001

(86) PCT No.: PCT/SE01/01018

§ 371 (c)(1),
(2), (4) Date: Mar. 11, 2003

(87) PCT Pub. No.: WO01/86331

PCT Pub. Date: Nov. 15, 2001

(65) Prior Publication Data

US 2003/0172680 A1    Sep. 18, 2003

(30) Foreign Application Priority Data

May 9, 2000    (SE) .................................. 0001708-7

(51) Int. Cl.
*C03B 37/07*    (2006.01)
(52) U.S. Cl. ............................. 65/378; 65/501; 65/407; 385/98
(58) Field of Classification Search .................. 65/407, 65/378, 384, 377, 485, 501; 385/98
See application file for complete search history.

(56) References Cited

U.S. PATENT DOCUMENTS

| | | | | | |
|---|---|---|---|---|---|
| 4,708,483 | A | * | 11/1987 | Lorenz | 356/602 |
| 5,495,428 | A | * | 2/1996 | Schwartz | 382/164 |
| 5,559,695 | A | * | 9/1996 | Daily | 701/1 |
| 5,570,446 | A | * | 10/1996 | Zheng et al. | 385/98 |
| 5,648,007 | A | * | 7/1997 | Reslinger et al. | 219/483 |
| 5,772,327 | A | | 6/1998 | Zheng | |
| 5,909,527 | A | | 6/1999 | Zheng | |

FOREIGN PATENT DOCUMENTS

| EP | 08800390 A1 | 11/1998 |
|---|---|---|
| EP | 0889337 A1 | 1/1999 |

* cited by examiner

*Primary Examiner*—John Hoffmann
(74) *Attorney, Agent, or Firm*—Nixon & Vanderhye P.C.

(57) ABSTRACT

In splicing two optical fibers to each other using an electric arc formed between electrodes images of the regions being heated and thereby fusioned to each other are taken. The images cover a rectangular field (43) having the fibers located centrally, along a center line of the field and parallel to the long sides of the field. The images are evaluated to determine a value of the position of the center of the electric arc in relation to the position of the end surfaces of the fibers. This value can then be used for placing the end surfaces just at the arc center. In the image the image of the optical fibers can be excluded so that only light intensity from the air discharge of the electric arc is recorded in the captured images. The field (41) excluded can be a narrow strip of uniform width located symmetrically around the image of the fibers. Using such a repositioning of the end surfaces of the fibers results in splices which are substantially equal to each other and thus a well repeatable splicing process is obtained.

23 Claims, 6 Drawing Sheets

METHOD OF SPLICING OPTICAL FIBERS WITH ARC IMAGINING AND RECENTERING

TECHNICAL FIELD

The present invention relates to splicing optical fibers using the heat from an electric arc generated between two electrodes and in particular to a method of arc recentering or centering the arc, i.e. positioning the arc and end surfaces of the optical fibers to be spliced in relation to each other so that the end surfaces are placed at the center of the arc.

BACKGROUND

In a common type of apparatus for splicing or welding optical fibers made from basically silica or quartz to each other a high voltage applied to a pair of electrodes is used to generate an electric arc enclosing end regions of the fibers to be spliced to each other. In the electric arc the temperature is high causing material of the optical fibers inside the arc to melt and by slightly pressing the ends of the fibers to each other (this operation called "overlap") a fusion-splice is obtained. The temperature in the fusion region must be above 1800° C. or generally about 2000° C. in order to melt the silica material of the fibers. When the fibers are heated to such high temperatures, some material from the fibers is evaporated and deposited on surfaces of the electrodes, in particular on the points or tips of the electrodes. The deposited material mainly appears as silica particles attached to the electrode surfaces, see the photograph in FIG. 1. A phenomenon which is directly correlated with the deposition of such particles is called "arc-walk" and comprises that the position of the center of the electric arc varies from one splice to the next one. This spatial movement of the arc is mainly caused by the dynamic process of particles being inhomogenously or non-uniformly deposited on the surfaces of the electrodes. The thickness of the deposited particle layer on the electrodes keeps on changing from place to place since part of the deposited particles are removed from the surfaces when the arc is active and new particles are deposited when the arc is turned off. Thus it is found, that instead of being ignited at the tips of the electrodes, the arc is often started from different spots at some generally small distance of the tips, this being dependent on the coverage of the deposited particle layer. As a consequence, arc-walk occurs. Arc-walk could result in a significant variation of the temperature distribution inside the fusion region which can in turn result in bad splices having high optical losses.

A few methods have been developed which involve temperature control and which thus can to some extent handle arc-walk, see e.g. U.S. Pat. No. 5,772,327 for Wenxin Zheng, "Automatic fusion-temperature control for optical fiber splicers", and U.S. Pat. No. 5,909,527 for Wenxin Zheng, "Automatic current selection for single fiber splicing". The methods disclosed in these patents are based on compensation of the electric current flowing between the electrodes in the fusioning operation in order to maintain a desired temperature inside the arc and in the fusioning region. However, only temperature control is not sufficient to handle the situation of large distances of arc-walk, such as distances e.g. larger than about 30 μm. This is because a high current compensation is needed for a large distance of the arc-walk which may give a strong influence on the temperature distribution within the fusioning region.

SUMMARY

It is an object of the present invention to provide a method of splicing optical fibers to each other giving low splicing losses for splices made successively one after another.

It is another object of the present invention to provide a method of splicing optical fibers in which the position of an electric arc is determined and used to move ends of the fibers to be spliced to each other to the center of the arc.

A problem which the invention intends to solve is thus how to determine the position of an electric arc used in fusion-splicing optical fibers to each other and using such a determined position to give low losses in splices or generally how to place the splicing position, i.e. the end surfaces or end regions of fibers to be spliced, and the electric arc in a centered relationship to each other.

Thus generally, a method using automatic arc recentering or arc repositioning is used. The method is based on recalibrating the position of the ends of the fiber to be spliced for each individual splice performed by determining spatial movements of the intensity distribution of the arc so that a desired fusion temperature in the end portions of the optical fibers is maintained. Using this method the resulting splices are more equal and the process is thus more stable compared to prior compensation methods only using adjustment of the arc current to maintain the average temperature of the arc region constant. The method can obviously be applied for both small and large distances of arc-walk.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DESCRIPTION OF PREFERRED EMBODIMENTS

Figure 1:
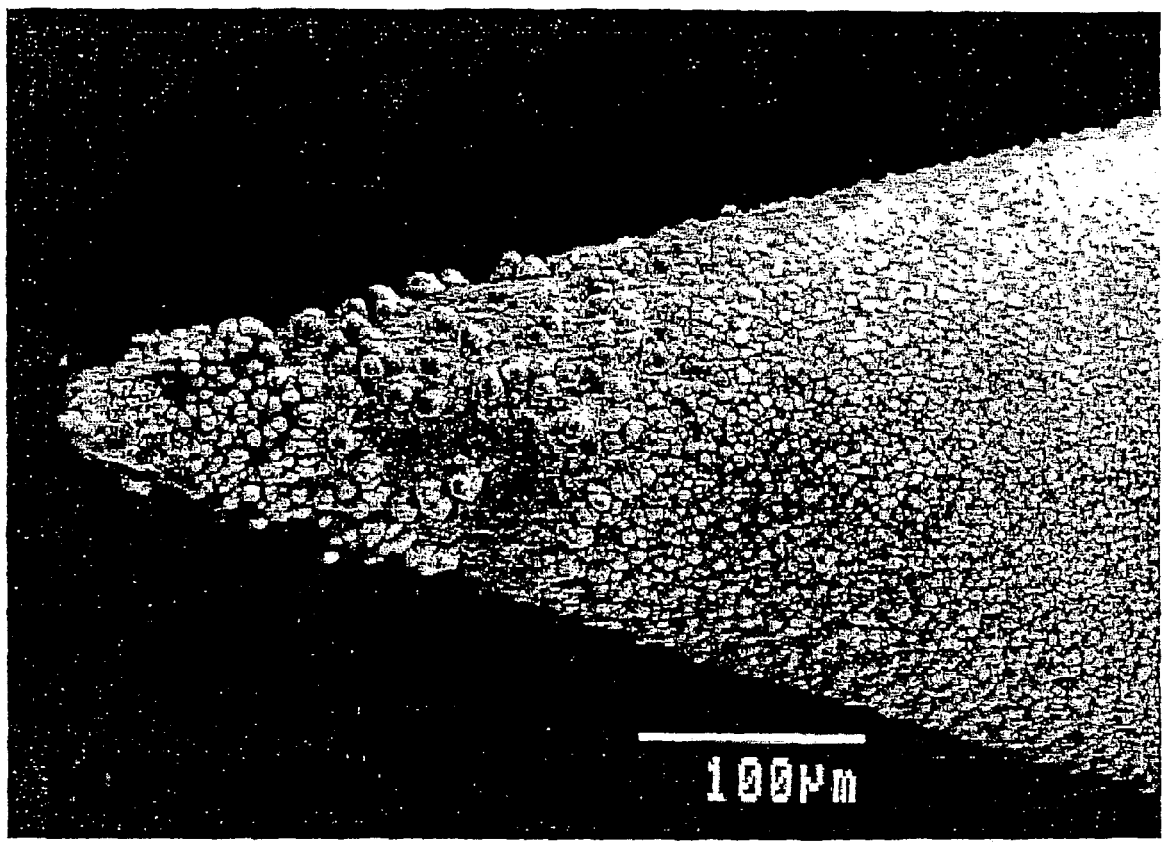
FIG. 1 is a microphotograph of the tip of an electrode used for splicing optical fibers.
Figure 2A:
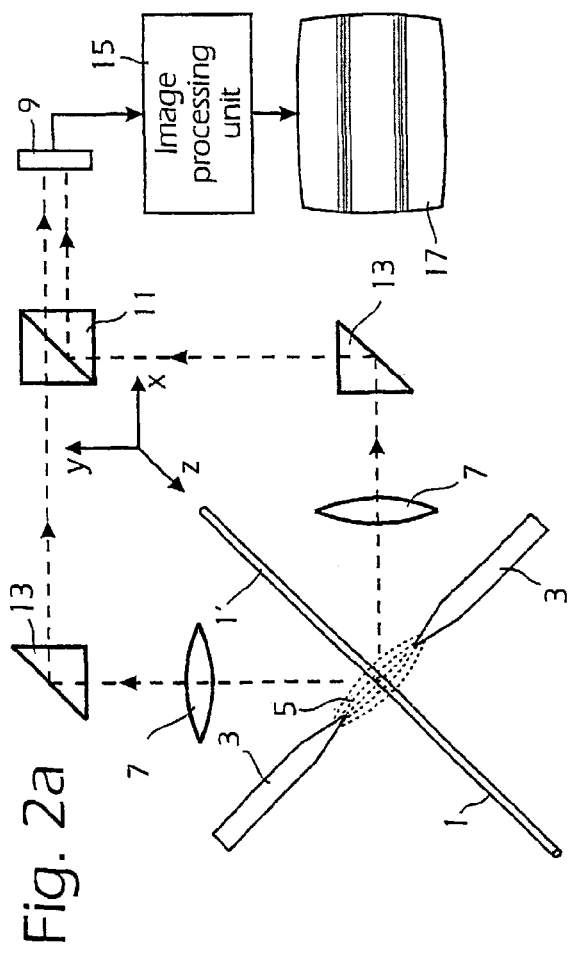
FIG. 2a is a schematic picture of a setup for fusion-splicing two optical fibers to each other.

In FIG. 2a the basic setup in an automatic optical fiber splicer is shown. The fibers 1, 1' have their end regions located between points of electrodes 3, between which an electrical discharge 5 is generated for heating the fiber ends, the intensity of the electrical discharge being controlled by the intensity of the electrical current between the electrodes 3. An optical system symbolized by lenses 7 depicts, in two perpendicular directions, the fiber end regions on the light sensitive area 9 of a camera, e.g. a plate carrying CCD elements, the light from the perpendicular directions being deflected by mirrors 11 and combined in a light combining device or beam splitter 13. In most automatic fiber fusion splicers of this type a digital imaging processing system 15 is provided for processing the electric signals from the light sensitive area 9 and thereby to monitor the fibers used and the splicing procedure by controlling fiber positioning devices and the intensity of the electrode current. The image processing system is connected to a monitor or display element 17 for e.g. showing the two images. Thus, as indicated in the figure, an image can show the splicing position between the fiber ends as viewed in the two perpendicular directions and positioned above each other.

Figure 2B:
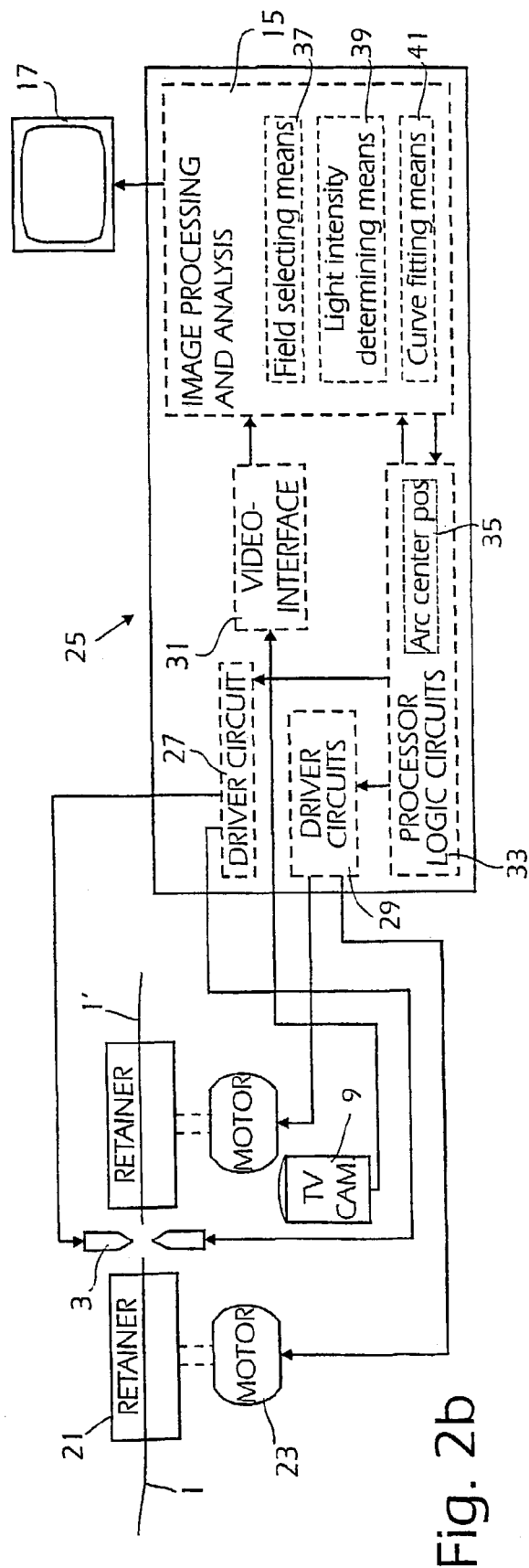
FIG. 2b is a schematic picture similar to that of FIG. 2b also showing some components of electronic control circuits.

In the schematic picture of FIG. 2b some more electrical details of a fiber splicing device of the automatic type are shown. Thus, the splicing device has fixtures or retainers 21, in which the end portions of the fibers 1, 1' are placed and firmly held during the positioning and the splicing. The retainers are movable in three orthogonal coordinate directions both in parallel to the longitudinal direction of the fibers and in two directions perpendicular to this direction. The retainers 21 are thus displaced along suitable mechanical guides, not shown, by control motors 23. Electric lines to the electrodes 3 and the motors 23 extend from an electronic circuit module 25, from driver circuits 27 and 29 respectively. From the TV camera 9 an electric line is arranged to a video interface 31 in the electronic circuit module 25, from which a suitable image signal is delivered to the image processing and image analysis unit 15. The various procedural steps are controlled by a control circuit 33, e.g. a suitable micro processor. The control circuit 33 performs the procedural steps mentioned above and thus controls the displacement of the fiber ends in relation to each other by energizing the motors 23 in suitable displacement directions, provides a signal to the image processing and image analysis unit 15 for starting an analysis of an obtained image. Further, the control circuit 33 controls the time, when a fusion current is to be started to be provided to the electrodes 5 and the time period during which this current is to be delivered and the intensity of the current.

When the optical fibers 1, 1' are heated by the electric arc 5, the thermal radiation emitted from the heated fiber portions and from the air discharge can be observed using the video-camera 9 and analyzed using the digital image processing system 15 of the splicing device. Since the observed light intensity distribution is directly correlated to the emission of light and the largest emission is from the regions which have the highest temperature, i.e. primarily the arc and in particular solid objects within the arc, information on the location of the arc and its movements can be obtained by observing and carefully analyzing the light intensity distribution.

Figure 3A:
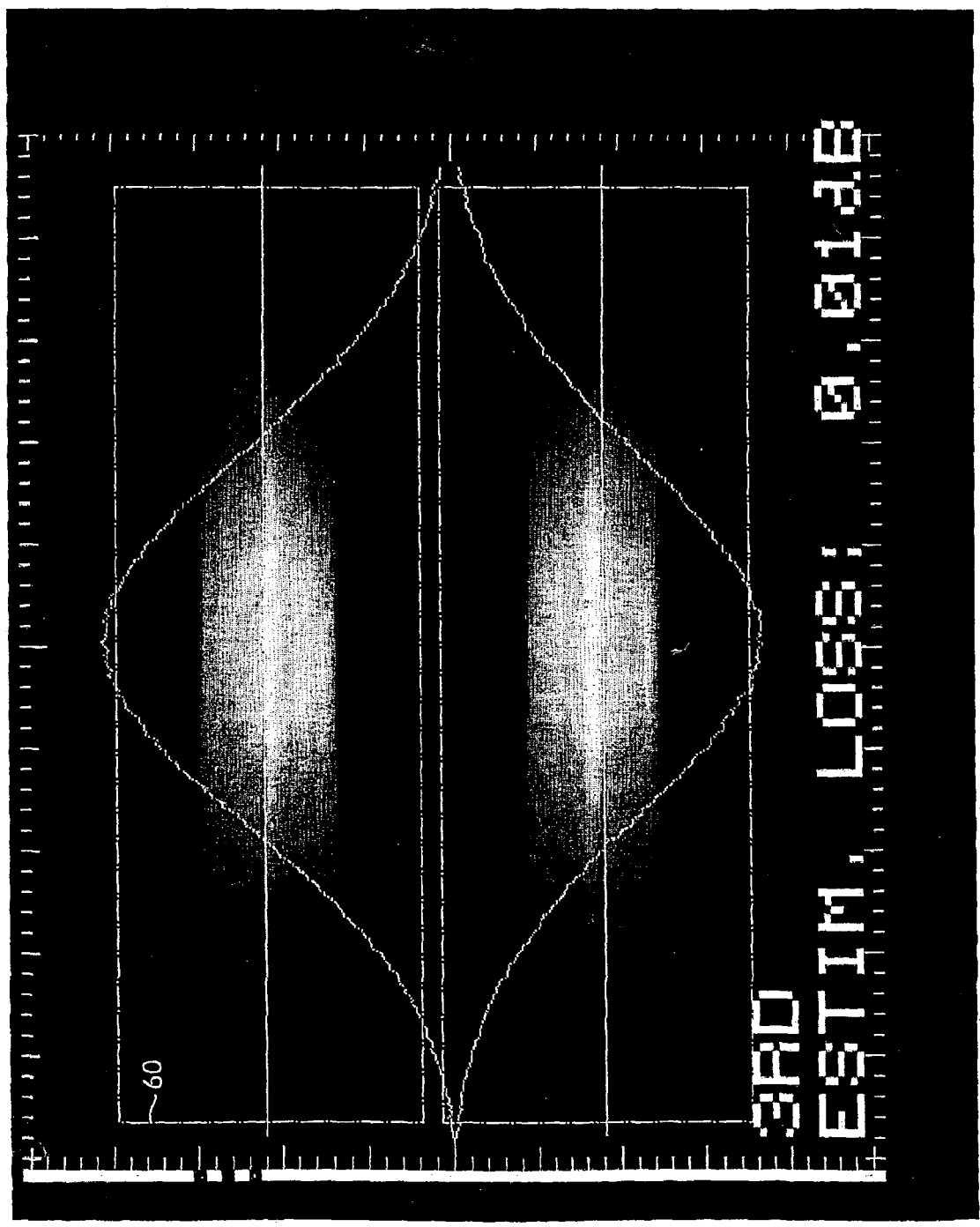
FIG. 3a is a picture of the display of an automatic optical fiber splicer showing images of spliced similar fibers and determined curves of total light intensity.

In the picture of FIG. 3a two images are shown, showing the splice portion of two identical optical fibers of type single mode in the splicing operation when the end portions of the fibers are intensely heated as they appear in the same display of a monitor of an automatic fiber splicer, the two images being taken in directions perpendicular to each other, the x- and y-directions, see the coordinate system shown in FIG. 2a, and the two images being placed one above the other one. The images are taken as elongated rectangular fields having their long sides parallel to the longitudinal direction or the axis of the fibers at the splicing position, i.e. the z-axis, the image of the fibers being spliced/the spliced fibers being located along a center longitudinal line of the respective field. For each position in the longitudinal direction of the fields, which then is the z-direction, i.e. the direction along the fiber end regions, the total light intensity can be determined in the image, i.e. for each z-value the light intensity appearing in the image is integrated in the perpendicular direction, which is then the x- or y-direction, to give total light intensity curves which are also plotted on the monitor display as shown in FIG. 3a. The total light intensity curves have a rather simple shape with a symmetric peak, the position of the peak obviously indicating the center of the highest intensity of emitted light. These curves can be used for determining the center of the arc.

The position of the highest value of the light intensity curve indicates approximately the center position of arc. However, the position of the peak of a smooth curve in the best possible way adapted or fitted to the measured light intensity values and thus accurately depicting the observed light intensity will give a better indication of the center position of the arc. Thus, in order to accurately determine the position of the imaginary peak value and thereby the position of the center of the arc, some curve fitting method can be used. Such a method is the so-called Chi-Square ($\chi^2$) fitting method. It will be assumed herein that the distribution of light emitted from an optical fiber within in an elongated, rectangular observation field primarily located parallel to the fiber (the z-direction), which is the case considered here, and even being located in some angle thereto, can be modeled by the sum of a Gaussian function $G(x, a_1, a_2, a_3)$ and a constant C, the constant representing a background light intensity which is produced by background illumination, optical and electronic noise, etc. and which can be assumed to be constant over the observation field. The parameters $a_1$, $a_2$ and $a_3$ of the Gaussian function are the position of the center of the function, the length of the interval from the position of the full width to the position of the half maximum (FWHM) of the function and the maximum value of the function, respectively. The last mentioned parameter can often be fairly constant in an automatic fiber splicer having a depicting system with AGC (Automatic Gain Control) and no determination thereof is then needed. The quality of the fitting of the sum $[G(z, a_1, a_2, a_3)+C]$ for some chosen values of the parameters to the measured intensity values $I(z)$ can be evaluated by a reduced Chi-Square ($\chi^2$) function such as:

$$\chi^2 = \frac{1}{N-\mu} \sum_{i=1}^{N} \left( \frac{I(z_i) - G(z_i, a_1, a_2, a_3) - C}{\Delta I_i} \right)^2$$

There, $I(z_i)$ is the average of the measured values of light intensity at the i-th position $z_i$ with a measurement error-bar $\Delta I_i$. The quantity $\Delta I_i$ can be estimated by the standard deviation: $\Delta I_i \approx \sqrt{\Sigma(I_j(z_i)-I(x_i))^2}$ where $I_j(z_i)$ is the j-th measured intensity value at position $z_i$. $^jN$ is the number of positions for which light intensity is measured. The constant C can in standard imaging system of 256 grey scale levels be typically 1-2 grey scales. The constant μ is the number of fitting parameters varied during the fitting procedure and thus here $\mu \leq 4$ or even $\mu \leq 3$.

In this fitting method, the best set of fitting parameters $\{a_1, a_2, a_3, C\}$ is that which maximizes the probability of representing the measured data. In practice, one searches for a set of fitting parameters giving a value of the test index $\chi^2$ of about 1 or generally a smallest possible value. Thus, by varying the fitting parameters and calculating for each set of varied parameters the corresponding value of $\chi^2$, one finds the best set of fitting parameters and in that set the value of the parameter $a_1$ indicates the position of the peak of the curve of measured light intensity values and this position indicates the position of the center of the arc.

If the errors in each measurement point cannot be determined or estimated, such as when having only the two images captured at one single occasion in the splicing procedure, in the curve fitting a procedure of the type least sum of squares can be used.

Furthermore, the images used in determining the light intensity values can be captured at at least two different stages of the process of splicing two fibers to each other:

(1) Prior to applying the main, large fusion current for melting to fiber ends to each other, a probing arc with an appropriately set lower current can be applied for a suitably selected short time period to take some images which are used to calculate the position of the center of the arc based on some curve fitting method such as that described above. The set current intensity and the time for energizing the electrodes are then chosen to ensure that high quality images can be captured without damaging well-prepared fiber end surfaces and in particular the edges thereof. After the calculation of the position of the center of the arc, the fiber ends can be positioned to have their end surfaces at the determined position of the arc center to give the best possible splicing conditions. This method can be called "direct arc recentering".

(2) The images used for determining light intensity values and therefrom the position of the center of the arc can also be taken when applying the main fusion current. Since the fiber ends are spliced to each other using main fusion current, the calculated information on the position on the center of the arc cannot be used to directly recenter the fiber end surfaces in the splice being made. However, the obtained information on the position of the arc can be used to predict a suitable position at which the fiber ends will be placed for next splice using a forecast method such as the so-called exponentially weight moving average (EWMA) method, as will be described hereinafter. This method can be called "indirect arc recentering".

Figure 4:
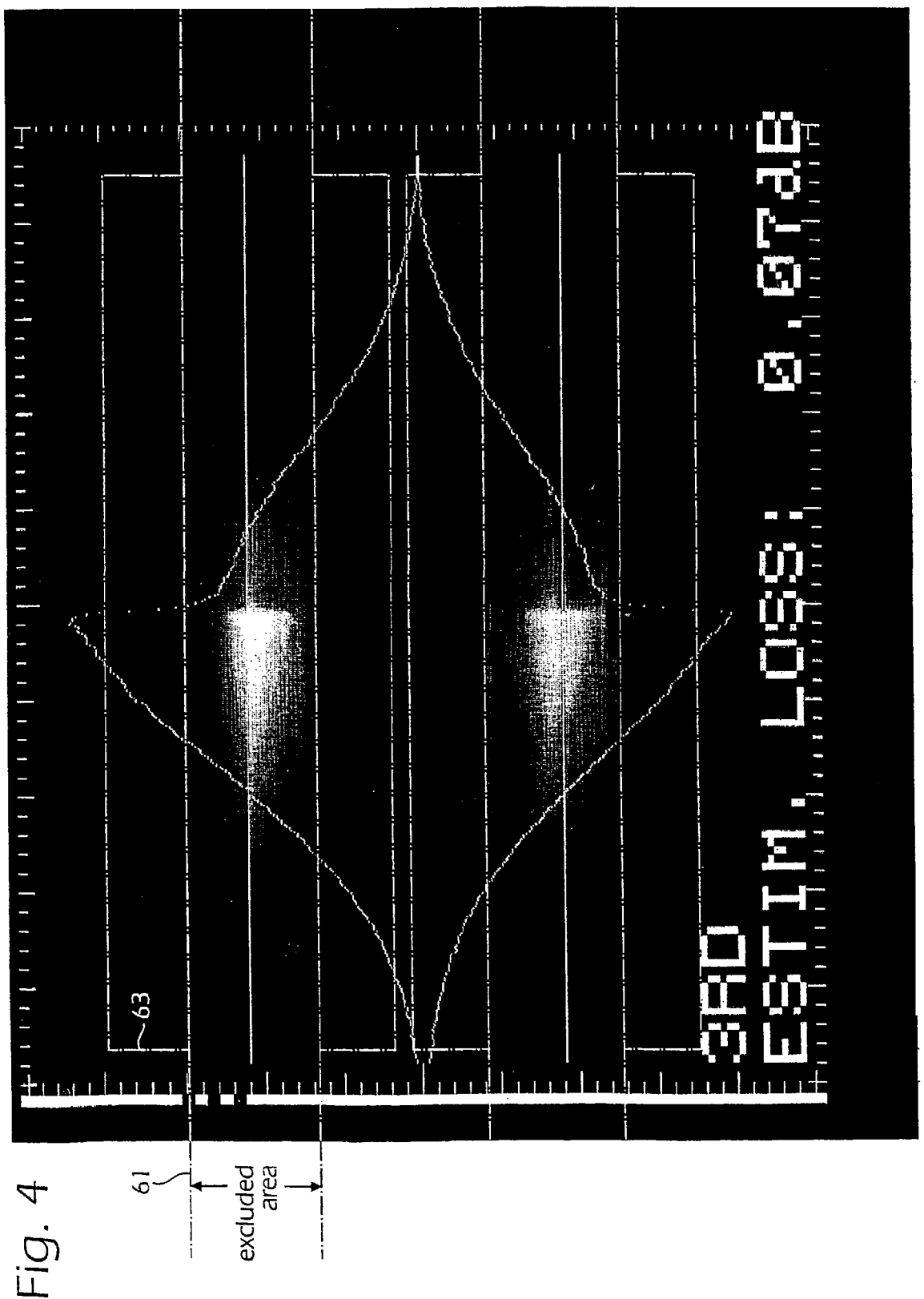
FIG. 4 is a picture similar to that of FIG. 3a for dissimilar spliced fibers.

Images similar to those shown in FIG. 3a are only obtained in those cases where the fibers to be spliced are basically the same kind, i.e. have substantially the same dimensions and substantially the same composition. In many applications, however, fibers of different types are spliced to each other, e.g. when manufacturing optical fiber amplifiers such as erbium-doped amplifiers. Images taken when two fibers of dissimilar types are spliced to each other are shown in the picture of the monitor display in FIG. 4. The total light intensity curves determined from this figure in the manner described above for FIG. 3a are also seen in FIG. 4. These curves have not the simple symmetric shape of the curves seen in FIG. 3a, a step or shoulder existing somewhere at the spliced surfaces. This shape results from the fact that the two fibers emit light differently from each other, the left fiber for example being an erbium-doped fiber emitting light more intensely than the right fiber, the right fiber for example being a single-mode and/or a small-core fiber. It is obviously quite difficult to use the total light intensity curves of the type shown in FIG. 4, due the lack of symmetry of the light intensity curves in the longitudinal direction, for finding the position of the center of the arc where the fiber end surfaces to be spliced should be placed.

In order to determine a value of the position of the center of an electric arc, in particular when making a splice between two optical fibers of different types, the thermal light emission only from the air-discharge in the arc region can be used to find light intensity values suitable for a curve fitting process, such as that described above. This means that in the image fields of FIGS. 3a and 4 the light intensity in a central region around the image of the fibers to be spliced/being spliced has to be excluded in the determination of the total light intensity as described above. The central region 41 to be excluded then has the shape of a narrow rectangular field or strip located centrally in the image field as indicated by area between the dash-and-dot lines 61 in each image in FIG. 4. Generally then, the total light intensity is determined for each z-value in one or two rectangular fields 63 having their long sides parallel to the longitudinal axis of the fibers, the rectangular fields not containing any portion of the image of the fibers and preferably having a nearest long side located at some distance of said image of the fibers, this distance corresponding e.g. at least to one or two widths or diameters of the fibers as seen in the image. The rectangular fields 63 in each image can be placed symmetrically in relation to the image of the fibers.

For the total light intensity curves determined in this way excluding the fiber images the same determination as described above using some curve fitting process such a $\chi^2$-fitting method to find a best fitting curve can be made from which the position of the maximum of the found curve light intensity directly gives a good measure of the position of the center of the arc. Using the determined position value the end surfaces of fibers to be spliced can be repositioned to place the fiber end surface in the center of the arc. The images used in the determination can also in this method be obtained by direct or indirect arc recentering.

Figure 3B:
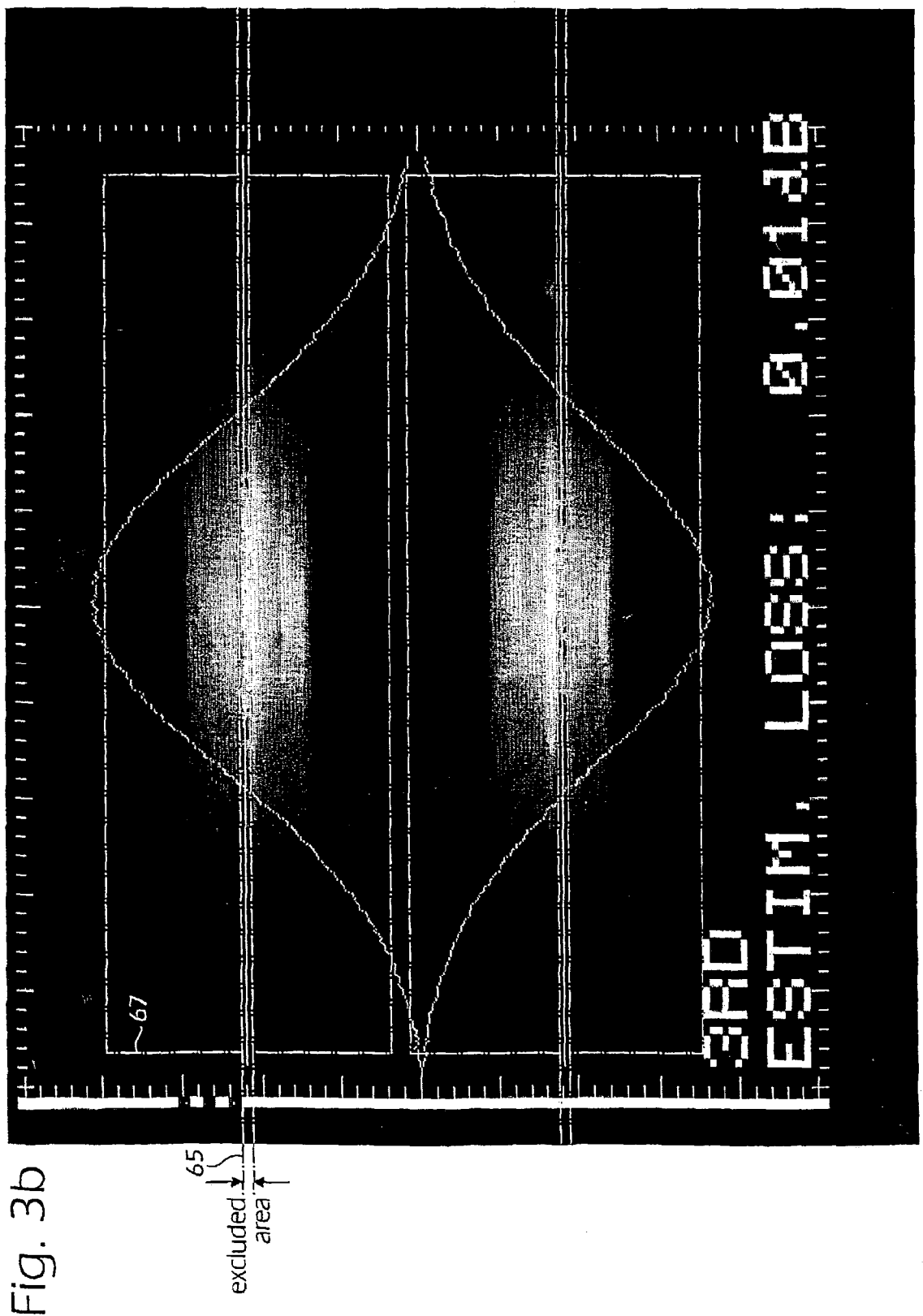
FIG. 3b is a picture similar to that of FIG. 3a also showing areas preferably excluded in determining light intensities used in calculation of the position of an arc.

Furthermore, it can be advantageous to exclude, in a way corresponding to that described above, the image of the fiber cores when evaluating images of splices of similar fibers, i.e. images of the kind seen in FIG. 3a. In that case only a very narrow region around the image of the cores is not considered in the determination of the light intensity for different z-coordinate values. Such a narrow region is seen between the lines 65 in FIG. 3b, leaving at each side of the fiber core a rectangular area 67 used in the calculation of the light intensity.

The method of direct arc recentering as described above is straightforward. However, this method may result in a large error in the determination of the position of the center of the arc if the arc is unstable during capturing the images used for calculating the light intensity values from the position of the center is determined. Instabilities in the arc can e.g. be caused by sparks. In order to reduce the influence of arc instability, the method of indirect arc recentering supplemented with a moving average method to find a reliable position of the center of the arc, as briefly mentioned above, can be used. Using such a moving average method the position of the arc center in a sequence of splices is predicted by the contributions of historical data of the arc centers. In particular, for the exponentially weight moving average (EWMA) method, a new position $z_{new}$ of the center of the arc is determined from the position $z_{old}$ used for the latest splice being modified by the center position $z_{calc}$ calculated from light intensity values obtained from images captured when making said splice, according to the following recursive equation $$z_{new} = (1-\alpha)z_{old} + \alpha z_{calc} \qquad (2)$$

where α is weighting factor having a value between 0 and 1. The start value to be used for the first calculation according to Eq. (2) is taken as the electrode position.

Figure 5:
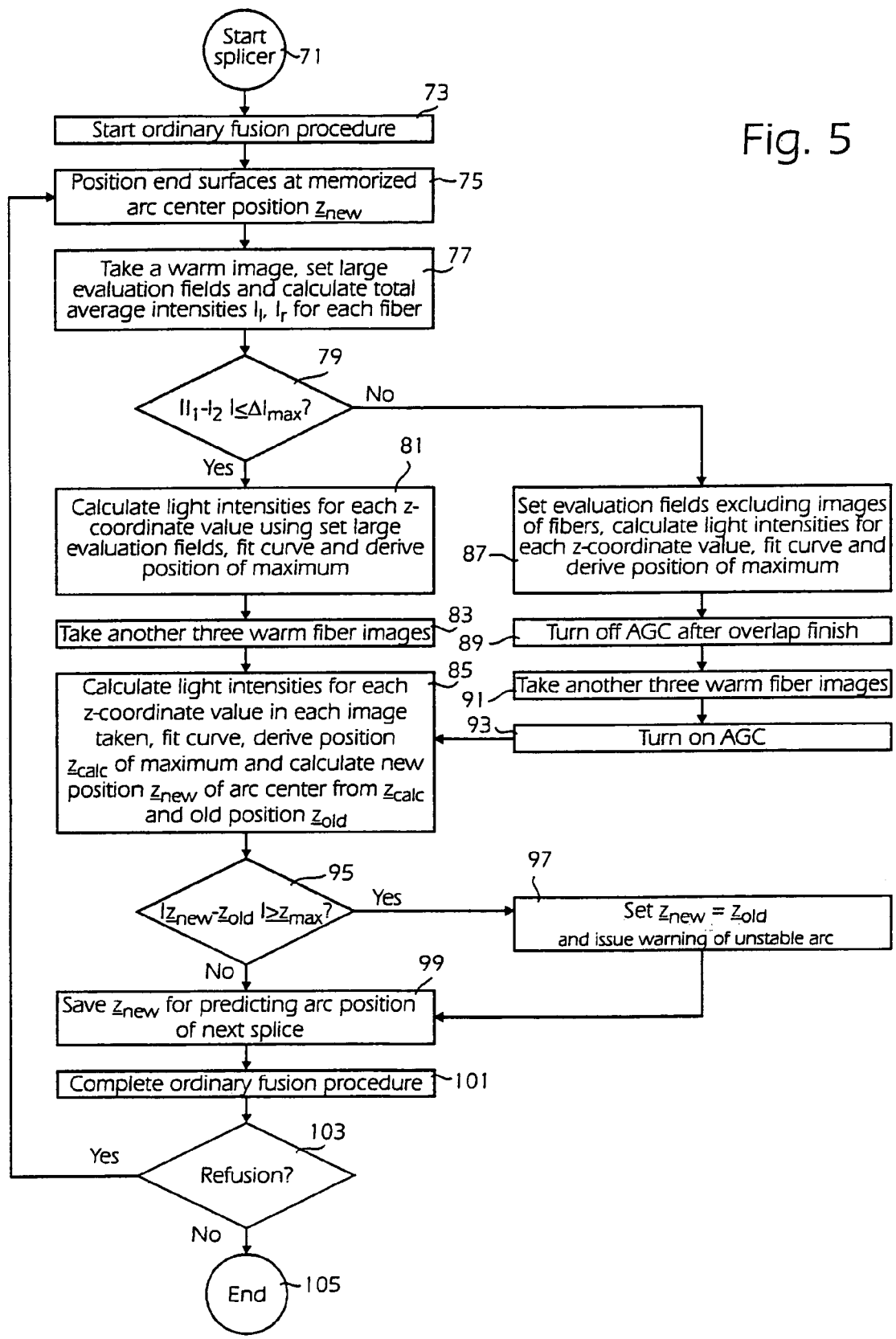
FIG. 5 is flow diagram of a procedure used for arc-recentering in an automatic optical fiber splicer.

The operational steps when making a splice using a procedure as outlined above will now be described with reference to the flow chart of FIG. 5. Thus, in a block 71 the splicer is started and in particular the control circuit starts executing a predetermined program including special steps for arc recentering. In the next block 73 the ordinary fusion procedure is started. In the block 75 performed next the end surfaces of the fibers to be spliced are set at the z-value $z_{new}$ calculated using Eq. (3) from the previous splices as stored in a storage location 35 in the control circuit, see FIG. 2b. In a following block 77 the arc is already started and then commands are issued to the image evaluation circuit 15, see also FIG. 2b, to take warm fiber images and evaluate them. Then, fields in the captured images for determining the light intensity values are in this step 77 selected by a functional block 37 of the evaluation circuit 15 and for these fields the total average intensity for the left fiber and the right fiber is calculated by another functional block 39, these functional blocks appearing in FIG. 2b. The selected fields are thus in this step taken to be divided along a vertical line at the end surfaces. In this step thus the total light intensity for each z-value is determined as described above and then these values for $z < z_{new}$ are added and divided by the number of such values to give an average value $I_l$ and the total light intensity values for $z > z_{new}$ are added and divided by the number of these values to give an average value $I_r$. It is thereupon tested in a block 79 whether the absolute difference $|I_l - I_r|$ of these averages is smaller than or equal to some threshold value $\Delta I_{max}$.

If it is determined in the block 79 that the absolute difference satisfies the tested condition, the light intensities emitted from each fiber are deemed to be sufficiently equal to each other and the splice is probably made from two fibers having identical physical characteristics. Then in a block 81 the fields for calculating the total intensity values are set to be the whole rectangular fields of the images, no division line being used. Then additional three warm fiber images for each perpendicular direction are captured in a block 83. In the next block 85 the three warm fiber images for each perpendicular direction are evaluated in a function block 41 in the evaluation circuit 15, see FIG. 2b, according to the procedure described for finding the peak intensity values. Then the calculated position $z_{calc}$ of the center of the arc can be found as an average of these values for each perpendicular direction. From the calculated position a new value of $z_{new}$ is determined by the control circuit 33 using Eq. (3).

If it is determined in the block 79 that the absolute difference does not satisfy the tested condition, the light intensities emitted from each fiber are not sufficiently equal to each other and the splice is probably made from two fibers having different physical characteristics. Then in a block 87 the fields for calculating the total intensity values are set, by the field selecting block 37, to now be the whole rectangular fields of the images but excluding the center strip along the images of the fibers. Thereafter, in a block 89 the sensitivity of the image capturing system of the fusioning device is set to give a good image of the regions of the image outside the image of the fibers. This means e.g. that possible automatic gain control (AGC) functions of the image capturing system are disabled and that the sensitivity is increased since the intensity of light emitted by the air-discharge is much lower than the intensity of light emitted from the heated solid objects in the images, i.e. from the fibers. This setting of the sensitivity can be made after the step called overlap of the ordinary fusion process in which the end surfaces of the fibers have been moved against other and pressed to each other compressing slightly the end portions. Then in a block 91 additional three warm fiber images for each perpendicular direction are captured. The sensitivity of the image capturing system is reset to the normal value in a following block 93. Then the block 85 is performed as above for finding the calculated position $z_{calc}$ and a new value of $z_{new}$.

After the block 85 a block 95 is executed in which the new value of $z_{new}$ is compared to the previously value used which is now called $z_{old}$. If the absolute difference $|z_{new} - z_{old}|$ of these averages is larger than or equal to some threshold value $z_{max}$ there has been a large change of the position of the arc center and then a block 97 is performed in which a warning to an operator of the device is given that the arc is unstable. Otherwise, if the absolute difference is smaller than the threshold value there has been a normal change of the arc position and a block 99 is executed in which the new modified z-position value $z_{new}$ is stored. The block 99 is also executed after the block 97 in which the alarm was given. The ordinary fusion process is finished in a block 101. It is thereupon decided in a block 103 whether a refusion, i.e. a special process in which only the main fusion procedures without performing the other procedures, e.g. fiber alignment, overlap etc. are executed, is to be made and in the case that a re-fusion will be made, the block 75 is next executed. Otherwise the procedure is ended in a block 105.

The procedure as described with reference to FIG. 5 has used the "indirect arc recentering" method. In the method "direct arc recentering" all the images are taken before the very fusioning operation and in block 99 also the end surfaces of the fibers being spliced are positioned at the normally somewhat modified value $z_{new}$.

The procedure as described has been used in automatic fiber splicers such as the automatic splicer FSU975 manufactured by the company Ericsson. Thus, in Table 1 some results of tests for splices made between four combinations of fibers are given. In the tests, 15 splices for each of the four fiber combinations were performed in sequence, i.e. a total of 60 splices were made, without using any means to clean the electrodes. Very stable results were obtained. Low splicing losses were obtained also for difficult combinations of fibers such as for splices between carbon-coated erbium-doped fibers and small-core fibers, which have a core diameter of e.g. 4 μm.

TABLE 1

| Spliced fibers | Average splice loss (dB) | Standard deviation (dB) | Minimum loss (dB) | Maximum loss (dB) |
| --- | --- | --- | --- | --- |
| Erbium-doped/small-core | 0.05 | 0.03 | 0.02 | 0.10 |
| Single-mode fiber/single-mode fiber | 0.03 | 0.02 | 0.01 | 0.06 |
| Erbium-doped/single-mode fiber | 0.01 | 0.01 | 0.01 | 0.03 |
| Small-core fiber/small-core fiber | 0.02 | 0.01 | 0.01 | 0.06 |

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A method of splicing two optical fibers, a left fiber and a right fiber, to each other, the method comprising:
    placing the two optical fibers having their end regions aligned with each other and their end surfaces at or in close contact with each other,
    initiating supply of electric voltage to electrodes to produce an electric arc between points of the electrodes, the electric arc heating regions of the two optical fibers at the end surfaces thereof,
    capturing at least one image of the heated regions of the two optical fibers and of a region surrounding the heated regions,
    evaluating said at least one captured image to determine a position of highest light intensity in said at least one captured image and taking the determined position to represent the position of the center of the electric arc,
    moving the two optical fibers in relation to the electrodes in accordance with the determined position so that, if said at least one captured image would have been captured after moving the two optical fibers, the determined position would be centered in areas depicting the end surfaces in said at least one captured image, hence the center of the electric arc being placed substantially centered in the end surfaces after moving the two optical fibers,
    continuing to supply electric voltage to the electrodes to fusion material of the two optical fibers at the end surfaces together to give a splice, and
    stopping supplying electric voltage to the electrodes and allowing the heated regions to cool.

2. The method of claim 1, wherein, in the step of evaluating said at least one captured image, the position of highest light intensity is determined as a position in a direction parallel to a longitudinal direction of areas representing the end regions in said at least one captured image.

3. The method of claim 1, wherein, in the step of evaluating said at least one captured image, only fields of said at least one captured image that are located outside areas representing the end regions in said at least one captured image are evaluated to determine the position of highest light intensity.

4. The method of claim 1, wherein, in the step of evaluating said at least one captured image, a rectangular field of said at least one captured image having long sides parallel to a longitudinal direction of areas representing the end regions in said at least one captured image and having said areas located substantially centrally in the rectangular field is evaluated.

5. The method of claim 1, wherein, in the step of evaluating said at least one captured image, two rectangular fields of said at least one captured image are evaluated, each of the two rectangular fields having long sides parallel to a longitudinal direction of areas representing the end regions in said at least one capture image and not including said areas, the two rectangular fields located symmetrically at the two sides of said areas.

6. The method of claim 1, wherein, in the step of evaluating said at least one captured image, only fields of said at least one captured image that are located outside areas representing cores of the two optical fibers are evaluated to determine the position of highest light intensity.

7. The method of claim 1, wherein, in the step of evaluating said at least one captured image, two rectangular fields of said at least one captured image are evaluated, each of the two rectangular fields having long sides parallel to a longitudinal direction of areas representing the end regions in said at least one captured image and not including areas representing cores of the two optical fibers, the two rectangular fields located symmetrically in relation to said areas representing the end regions.

8. The method of claim 1, wherein, in the step of evaluating said at least one captured image, total light intensity values are determined for consecutive positions equally spaced in a direction along a longitudinal axis of areas representing the end regions in said at least one captured image.

9. The method of claim 8, wherein, in the step of evaluating said at least one captured image, a smooth curve is fitted to the determined total light intensity values for the consecutive positions and that the position of a maximum of the smooth curve is taken to be the position of highest light intensity in said at least one captured image.

10. The method of claim 9, wherein the curve is the sum of a Gaussian function and a constant.

11. The method of claim 1, wherein, in the step of evaluating said at least one captured image, light intensities in images of the two optical fibers in said at least one captured image are first determined and compared to each other and, based on the result of the comparing,
    if the light intensities do not differ from each other more than a predetermined value:
        the position of highest light intensity is determined in a field in said at least one captured image that includes at least portions of the images of the two optical fibers, and
    if the light intensities differ from each other more than a predetermined value:
        the position of highest light intensity is determined in at least one field in said at least one captured image that does not include the images of the two optical fibers.

12. A method of splicing optical fibers to each other, the method comprising the steps of:
    placing two optical fibers having their end regions aligned with each other and their end surfaces at or in close contact with each other at a first position along a z-axis extending in parallel with the axis of the end regions,
    thereafter supplying electric voltage to electrodes to produce an electric arc between points of the electrodes, the electric arc heating regions of the two optical fibers at the end surfaces thereof to fusion material of the two optical fibers at the end surfaces together to give a splice, and then stopping the supplying of electric voltage to the electrodes and allowing the heated regions to cool,
    during the supplying of electric voltage to the electrodes, capturing at least one image of the heated regions of the two optical fibers and of a region surrounding the heated regions,
    thereafter evaluating said at least one captured image to determine a position of highest light intensity along the z-axis in said at least one captured image,
    taking the determined position to represent the position of the center of the electric arc,
    modifying said first position in accordance with the determined position, and
    thereafter repeating the above steps for two other optical fibers, placing their end surfaces at the modified first position along the z-axis.

13. The method of claim 12, wherein, in the modifying of said first position, said first position is replaced with a position directly corresponding to said determined position.

14. The method of claim 12, wherein, in the step of evaluating said at least one captured image, the position of highest light intensity is determined as a position in a direction parallel to a longitudinal direction of areas representing the end regions of the two optical fibers in said at least one captured image.

15. The method of claim 12, wherein, in the step of evaluating said at least one captured image, only fields of said at least one captured image that are located outside areas representing the end regions of the two optical fibers in said at least one captured image are evaluated to determine the position of highest light intensity.

16. The method of claim 12, wherein, in the step of evaluating said at least one captured image, a rectangular field of said at least one captured image having long sides parallel to a longitudinal direction of areas representing the end regions of the two optical fiber in said at least one captured image and having said areas located substantially centrally in the rectangular field is evaluated.

17. The method of claim 12, wherein, in the step of evaluating said at least one captured image, two rectangular fields of said at least one captured image are evaluated, each of the two rectangular fields having long sides parallel to a areas representing the end regions longitudinal direction of areas representing the end regions of the two optical fibers in said at least one captured image and not including said areas, the two rectangular fields located symmetrically at the two sides of said areas.

18. The method of claim 12, wherein, in the step of evaluating said at least one captured image, only fields of said at least one captured image that are located outside areas representing cores of the two optical fibers in said at least one captured image are evaluated to determine the position of highest light intensity.

19. The method of claim 12, wherein, in the step of evaluating said at least one captured image, two rectangular fields of said at least one captured image are evaluated, each of the two rectangular fields having long sides parallel to a longitudinal direction of areas representing the end regions of the two optical fibers in said at least one captured image and not including areas representing cores of the two optical fibers, the two rectangular fields located symmetrically in relation said areas representing the end regions.

20. The method of claim 12, wherein, in the step of evaluating said at least one captured image, total light intensity values are determined for consecutive positions equally spaced in a direction along a longitudinal axis of areas representing the two optical fibers in said at least one captured image.

21. The method of claim 20, wherein, in the step of evaluating said at least one captured image, a smooth curve is fitted to the determined total light intensity values for the consecutive positions and that the position of a maximum of the smooth curve is taken to be the position of highest light intensity in said at least one captured image.

22. The method of claim 21, wherein the curve is the sum of a Gaussian function and a constant.

23. The method of claim 12, wherein, in the step of evaluating said at least one captured image, light intensities in images of the two optical fibers in said at least one captured image are first determined and compared to each other and, based on the result of the comparing, if the light intensities do not differ from each other more than a predetermined value:

the position of highest light intensity is determined in a field in said at least one captured image that includes at least portions of the images of the two optical fibers, and if the light intensities differ from each other more than a predetermined value:

the position of highest light intensity is determined in at least one field in said at least one captured image that does not include the images of the two optical fibers.

* * * * *

UNITED STATES PATENT AND TRADEMARK OFFICE
CERTIFICATE OF CORRECTION

| | | |
|---|---|---|
| PATENT NO. | : 7,845,194 B2 | Page 1 of 1 |
| APPLICATION NO. | : 10/275687 | |
| DATED | : December 7, 2010 | |
| INVENTOR(S) | : Huang et al. | |

It is certified that error appears in the above-identified patent and that said Letters Patent is hereby corrected as shown below:

In Column 9, Line 56, in Claim 5, delete "capture" and insert -- captured --, therefor.

In Column 11, Lines 20-21, in Claim 17, after "parallel to a" delete "areas representing the end regions".

In Column 12, Line 4, in Claim 19, after "relation" insert -- to --.

Signed and Sealed this
Sixth Day of December, 2011

David J. Kappos
*Director of the United States Patent and Trademark Office*